United States Patent
Guy et al.

(10) Patent No.: US 10,730,407 B2
(45) Date of Patent: Aug. 4, 2020

(54) MOTOR VEHICLE SEATING SYSTEM

(71) Applicant: Ford Global Technologies, LLC, Dearborn, MI (US)

(72) Inventors: Ian Guy, London (GB); Marcus Hoggarth, Hertfordshire (GB); Ben Carroll, London (GB); Matthew Graeme Leck, Ruislip (GB); Kyle Loughlin, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 15/973,776

(22) Filed: May 8, 2018

(65) Prior Publication Data
US 2018/0354391 A1   Dec. 13, 2018

(30) Foreign Application Priority Data
Jun. 9, 2017 (GB) .................................. 1709254.5

(51) Int. Cl.
| B60N 2/07 | (2006.01) |
| B60N 2/01 | (2006.01) |
| B60N 2/06 | (2006.01) |
| B60N 2/02 | (2006.01) |

(52) U.S. Cl.
CPC ............. *B60N 2/0722* (2013.01); *B60N 2/01* (2013.01); *B60N 2/06* (2013.01); *B60N 2/062* (2013.01); *B60N 2/071* (2013.01); *B60N 2/0715* (2013.01); *B60N 2/0745* (2013.01); *B60N 2002/0236* (2013.01)

(58) Field of Classification Search
CPC ...... B60N 2/0722; B60N 2/01; B60N 2/0745; B60N 2/06; B60N 2/0715; B60N 2/062; B60N 2/071; B60N 2002/0236
See application file for complete search history.

(56) References Cited

U.S. PATENT DOCUMENTS

| 7,735,895 B2 * | 6/2010 | Brown ..................... B60N 2/06 296/65.01 |
| 2006/0076795 A1 | 4/2006 | Slade |
| 2010/0007163 A1 | 1/2010 | Almeida et al. |
| 2011/0109114 A1 | 5/2011 | Kolpasky et al. |
| 2012/0326478 A1 | 12/2012 | Blind et al. |
| 2016/0137104 A1 | 5/2016 | Bortolon et al. |
| 2016/0332539 A1 | 11/2016 | Rawlinson et al. |
| 2017/0028987 A1 | 2/2017 | Yamada |

(Continued)

FOREIGN PATENT DOCUMENTS

| DE | 102007040229 A1 | 2/2009 |
| DE | 102009033797 A1 | 3/2010 |
| DE | 102009021654 A1 | 11/2010 |

(Continued)

*Primary Examiner* — D Glenn Dayoan
*Assistant Examiner* — Melissa Ann Bonifazi
(74) *Attorney, Agent, or Firm* — David Coppiellie; Price Heneveld LLP

(57) ABSTRACT

A motor vehicle seating system is provided. The seating system comprises two or more seats and a guide track extending between three or more spaced apart seating positions within an interior of the motor vehicle, wherein each of the seats is movably coupled to the guide track, such that the seats are movable between the seating positions. A seat, suitable for use in the motor vehicle seating system is also provided.

19 Claims, 6 Drawing Sheets

(56) References Cited

U.S. PATENT DOCUMENTS

2017/0174103 A1 6/2017 Runde
2017/0253145 A1 9/2017 Runde et al.

FOREIGN PATENT DOCUMENTS

| | | |
|---|---|---|
| DE | 102014013955 A1 | 3/2016 |
| FR | 2635735 A1 | 3/1990 |
| FR | 2728860 A1 | 7/1996 |
| GB | 2038256 A | 7/1980 |
| GB | 2549598 A | 10/2017 |
| GB | 2563990 A | 1/2019 |
| JP | 2002120604 A | 4/2002 |
| JP | 2003118438 A | 4/2003 |
| JP | 2006160178 A | 6/2006 |
| JP | 2007106321 A | 4/2007 |
| JP | 2008254662 A | 10/2008 |
| WO | 9809834 A | 3/1998 |

\* cited by examiner

Fig. 1a
Fig. 1b
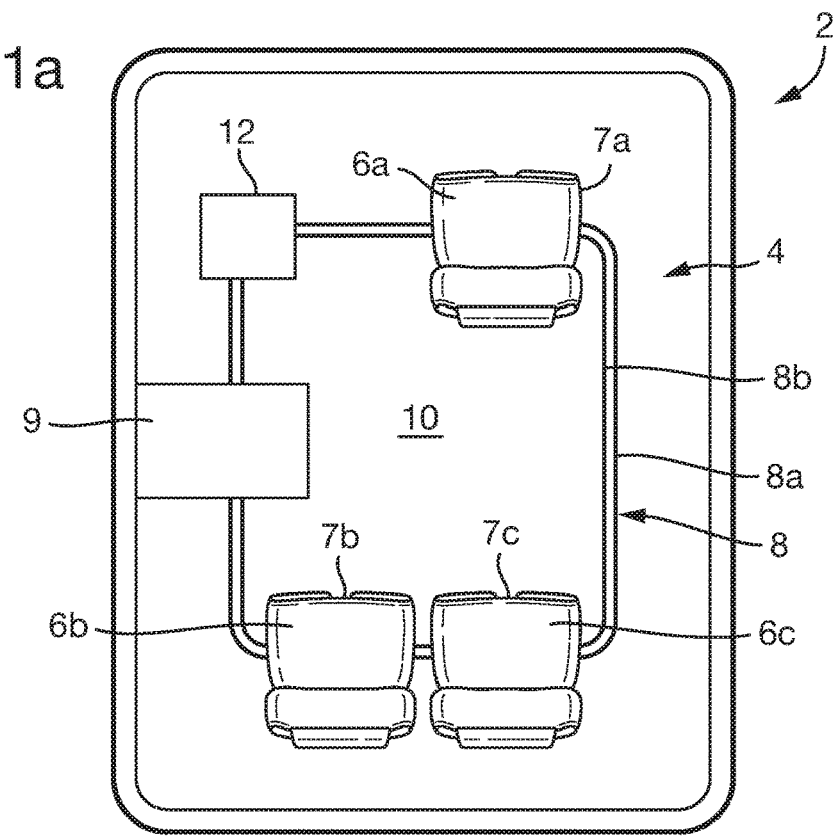
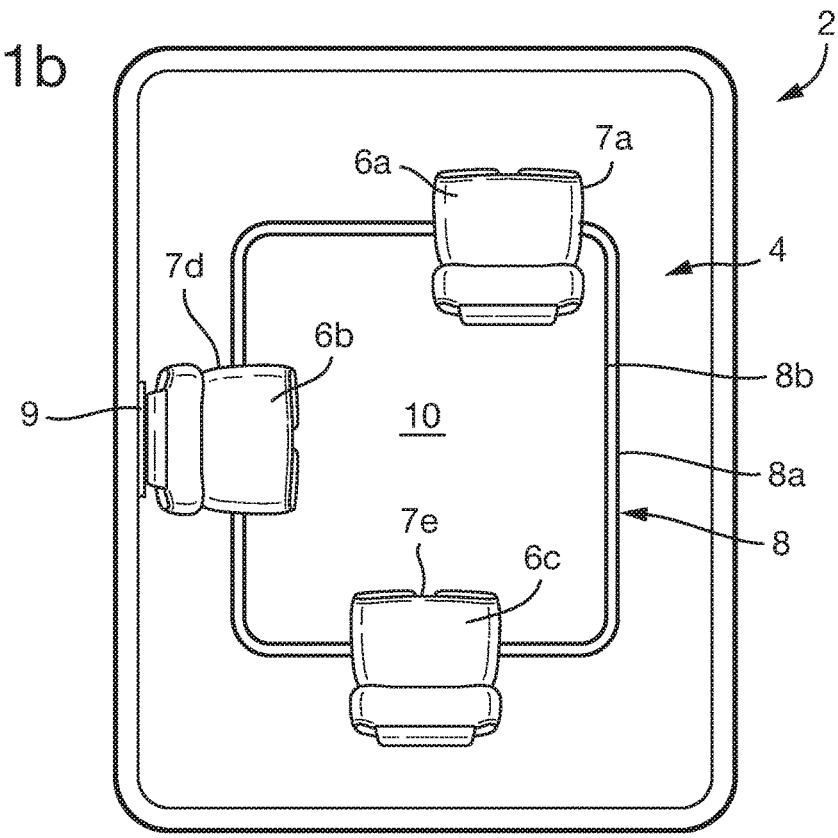

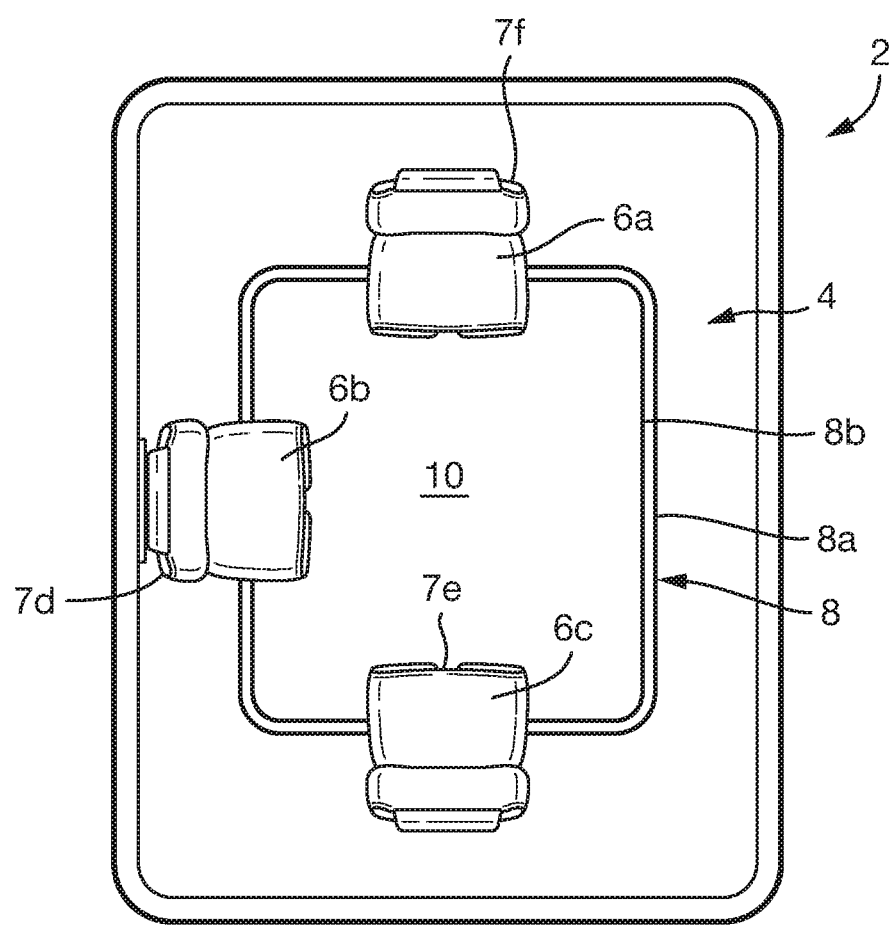

MOTOR VEHICLE SEATING SYSTEM

FIELD OF THE INVENTION

The present invention generally relates to a seating system for a motor vehicle, and more particularly relates to a seating system configured to increase the flexibility of vehicle seating arrangements.

BACKGROUND OF THE INVENTION

Motor vehicles are typically equipped with a plurality of seats that are arranged in one or more rows within the interior of the motor vehicle. Each of the seats is typically arranged to face forward in the direction of travel of the vehicle.

Such arrangements of seats may be convenient to allow the greatest number of seats to be provided within the vehicle. Additionally, such seating arrangements may be comfortable for travelling long distances in the vehicle. However, such seating arrangements may discourage interactions between the occupants of the vehicle, particularly between occupants who are not seated within the same row of seats.

It is desirable to allow for arrangements of seats within a motor vehicle that facilitate interaction between many or all of the occupants of the vehicle and allow collaborative activities to be performed during and between journeys in the vehicle.

SUMMARY OF THE INVENTION

According to an aspect of the present disclosure, there is provided a motor vehicle seating system. The seating system includes two or more seats and a guide track extending between three or more seating positions within an interior of the motor vehicle, wherein each of the seats is movably coupled to the guide track, such that the seats are movable between the seating positions. The seats may be movable by a user of the motor vehicle.

A seating position may refer to the position of a seat for an occupant during a journey in the vehicle. The seating positions may be spaced apart from one another. In other words, the seating positions may be such that footprints of the seats positioned in each of the seating positions would not overlap when viewed from above.

The guide track may extend at least partially around a space within the interior of the vehicle. A portion of the guide track may extend in a substantially longitudinal direction of the vehicle. Additionally or alternatively, a portion of the guide track may extend in a substantially lateral direction of the vehicle. Two or more of the seating positions may be laterally spaced apart within the interior of the vehicle along the laterally extending portion of the guide track. The guide track may comprise a curved portion provided between longitudinally and laterally extending portions of the guide track.

Each of the seats provided within the vehicle is movably coupled to the guide track. In other words, the guide track may be common to each of the seats within the vehicle. A first seating position may be located at or close to a front of the vehicle interior, e.g., in a driving position of the vehicle. The first seating position may be aligned with driving controls of the vehicle. A seat located in the first seating position may be arranged to face in a forwards direction such as when the driver is operating the vehicle, or rearwards direction of the vehicle such as when the vehicle is not being operating or is operating in an autonomous driving mode.

A second seating position may be located at or close to a rear of the vehicle interior. A third seating position may be positioned between the first and second seating positions in a longitudinal direction of the vehicle. Additionally, the third seating position may be spaced apart from the first and second seating positions in a lateral direction of the vehicle, For example, the third seating position may be positioned at or towards a side of the vehicle interior. A seat located in the third seating position may be arranged to face in a lateral direction of the vehicle, into the interior space of the vehicle.

One or more of the seats may be rotatable within the vehicle interior. The seats may be rotatable within the interior by virtue of a curved portion of the guide track. For example, the seats may rotate within the vehicle interior as they move along the curved portion of the guide track. In some arrangements, the seats may be rotatable in the seating positions, about axes of the respective seats. For example, a seat body of each of the seats may be rotatable relative to respective follower elements of the seats configured to movably couple the seats to the guide track.

The seating system may comprise a further guide track provided adjacent to one side of the guide track and extending parallel to the guide track between the three or more seating positions. The seats may be movably coupled to the further guide track.

One or both of the guide track and the further guide track may comprise a rail, a channel and/or a slot. Each of the seats may comprise one or more follower elements configured to movably couple the seat to the guide track and further guide track (where provided), e.g., at the rail, channel, and/or slot of the guide track and further guide track, respectively.

The seating system may comprise two or more securing mechanisms, e.g., at least one for each seat, configured to selectively secure the seats relative to a frame of the vehicle, such as to the guide track. Alternatively, at least one securing mechanism may be provided for each seating position. The seats may be secured to the guide track at the follower elements of the respective seats. Alternatively, the securing mechanisms may be configured to prevent the follower elements from moving along the guide track. For example, the securing mechanisms may prevent rollers of the follower elements rotating about respective pivots of the rollers.

The securing mechanisms may be provided on the seats and may be movable together with the seats between the seating positions. Alternatively, the securing mechanisms may be coupled to the guide track and/or a frame of the vehicle at or adjacent to the seating positions.

The seating system may comprise a seat position sensor configured to determine whether one or more seats are positioned in the seating positions. The securing mechanisms may be configured to secure, e.g., selectively secure, each of the seats relative to the frame of the vehicle when the seat position sensor determines that the seats are positioned in respective seating positions. The seating system may be configured to indicate to a user whether the seats are positioned in the seating positions.

The seating system may be configured to control the position of a trim portion of the vehicle when at least one of the seats is positioned in or moving through a predetermined position. For example, in order to prevent the trim portion obstructing the movement of the seat. The seat may move through the predetermined position when moving between seating positions. Alternatively, the seat may be positionable in the predetermined position. For example, the predetermined position may be a seating position.

The seating system may comprise one or more actuators configured to drive the movement of the seats between the seating positions. The seating system may comprise an actuator associated with each of the seats. Each actuator may be configured to drive the movement of the seat that it is associated with between the seating positions. Each actuator may be provided on the associated seat. The actuators may be coupled to the guide track and/or a frame of the vehicle.

The seating system may comprise one or more drive mechanisms, such as belt, chain or cable drives, driven by the actuators. One or more of the seats may be operatively couplable to the drive mechanisms. The drive mechanisms may transmit movement of the actuators to the seats.

The seats may each comprise a drive coupler configured to selectively couple the seat to a drive mechanism driven by the actuator. Two or more of the seats may be couplable to a particular drive mechanism. When the seats are coupled to the drive mechanisms via their respective drive couplers, the movement of the seats may be driven by the actuator. When the seats are not coupled to the drive mechanism, the seats may not be moved by the actuator. In this way the relative positions of the seats may be controlled by individually coupling and decoupling the seats to and from the drive mechanism.

The seating system may be configured to decouple a particular seat from the drive mechanism when the particular seat has been moved into a particular seating position, such as a desired seating position selected by a user, so that the particular seat remains in the particular seating position. The other seats may remain coupled to the drive mechanism and may be moved by the drive mechanism into further seating positions.

One or more of the seats may be configured such that seat bodies of the seats are movable relative to a position on the guide track at which the seat is coupled, e.g., rotatable about a vertical axis of the seat and/or slidable in a direction in which the seat is facing. The seat body of each seat may be movable relative to a seat base or pillar of the seat which is coupled to the guide track. Additionally or alternatively, the seat body and/or seat base or pillar may be movable relative to the follower elements of the seat.

One or more of the seats may be configured such that a width of a seat body of the seat is adjustable. For example, the width of the seat body of the one or more seats may be adjustable between a first width and a second width. The first width may be narrower than the second width. The seating system may be configured such that the seat bodies of two adjacent seats laterally spaced apart from one another within the vehicle interior, abut when the widths of the seat bodies of two adjacent seats are the second width. The seating system may be configured such that at least one of the seats is movable along the guide track without contacting an interior wall of the vehicle or the other seats when the width of the seat body is the first width.

The seating system may further comprise a table movably coupled to the guide track, such as coupled at a pillar or column of the table. The table may be movably coupled to the guide track in the same way as the seats.

According to another aspect of the present disclosure, there is provided a seat for a seating system of a motor vehicle. The seat comprises a seat body, a pillar coupled to the seat body at a first end of the pillar and configured to support the seat body, a boss coupled to a second end of the pillar, and one or more follower elements coupled to the boss and configured to movably couple to a guide track provided on the motor vehicle, such that the seat is movable within an interior of the vehicle between two or more spaced apart seating positions.

The seat body may be movably, e.g., pivotally and/or slidably, coupled to the first end of the pillar. Additionally or alternatively, the second end of the pillar may be movably coupled to the boss. Additionally or alternatively again, the follower elements may be movably coupled to the boss, such that the seat body, seat pillar and the boss are movable relative to the follower elements.

The seat may comprise a securing mechanism. The securing mechanism may be configured to prevent movement of the seat relative to the guide track and/or a frame of the motor vehicle when the securing mechanism is applied. For example, the securing mechanism may engage with one or more of the follower elements and/or the guide track and prevent movement of the follower elements relative to the guide track. Alternatively, the securing mechanism may be configured to couple the seat to the vehicle frame.

Additionally or alternatively, the seat may comprise a securing point couplable to a securing mechanism provided on the guide track or a frame of the vehicle. The securing mechanism may be coupled to the securing point in order to prevent movement of the seat relative to the guide track and/or the frame of the vehicle when the securing mechanism is applied.

The seat may comprise a seat position sensor configured to determine whether the seat is located in one of the seating positions. The securing mechanism may be configured such that the securing mechanism may be applied when the seat is located in one of the seating positions when the seat position sensor determines that the seat is located in one of the seating positions. For example, when the seat is located in one of the seating positions, two or more components of the securing mechanism may be aligned, or the securing mechanism may be aligned with a securing point, thereby allowing the securing mechanism to be applied.

The seat may comprise an actuator configured to drive the movement of the seat between the seating positions. Alternatively, the seat may comprise a drive coupler configured to selectively couple the seat to a drive mechanism of the seating system configured to drive the movement of the seat between the seating positions.

A motor vehicle may comprise the above-mentioned seating system or the above mentioned seat.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1a is schematic views of a seating system for a motor vehicle, according to arrangements of the present disclosure, in a first seating configuration;

FIG. 1b is schematic views of a seating system for a motor vehicle, according to arrangements of the present disclosure, in a second seating configuration;

FIG. 1c is schematic views of a seating system for a motor vehicle, according to arrangements of the present disclosure, in a third seating configuration;

DETAILED DESCRIPTION OF THE PREFERRED EMBODIMENTS

Figure 2:
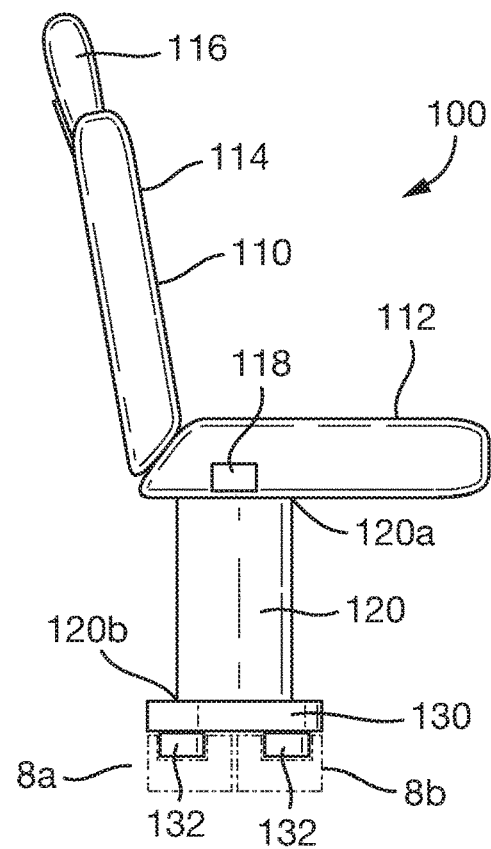
FIG. 2 is a schematic view of a seat for a seating system, according to arrangements of the present disclosure.

With reference to FIGS. 1a, 1b and 1c, a motor vehicle 2 comprises a seating system 4 according to one embodiment. The seating system 4 comprises a plurality of seats 6a, 6b, 6c and a guide track assembly 8 common to each of the seats. The seats 61, 6b, 6c are movably supported by the guide track assembly 8, such that the seats are movable between seating positions 7a, 7b, 7c, 7d, 7e, 7f defined within the vehicle. At least some of the seating positions may be spaced apart from one another such that a footprint of a seat in a seating position when viewed from above does not overlap with the footprint of the seat when in another seating position.

In the arrangement shown in FIGS. 1a-1c, the seating system 4 comprises three seats, namely a first seat 6a, a second seat 6b and a third seat 6c. The seats 61, 6b, 6c are movable between six seating positions 7a-7f In other arrangements, the seating system may comprise one, two, four, or more than four seats, which may be movable between two, three or more than three seating positions. In some arrangements, particular or discrete, seating positions may not be defined by the seating system, and the seats may be movable to any desired position along the guide track assembly 8.

As depicted in FIGS. 1a-1c, the guide track assembly 8 comprises a first guide track 8a and a second guide track 8b. The second guide track 8b is arranged to the side of or radially outside, of the first guide track 8a. The first and second guide tracks 8a, 8b extend around a space 10 within the interior of the vehicle 2. In the arrangement shown, the guide track assembly 8, extends completely around the space 10 to form a closed loop enclosing the space 10. In other arrangements, the guide track assembly 8 may extend partially around the interior space 10.

When the guide track assembly 8 forms a closed loop, the seats 6a, 6b, 6c may be movable completely around the loop such that a particular seat is movable from a first seating position such as position 7a, through the other seating positions such as positions 7b-7f, back to the first seating position. Each of the seats may thereby be positioned in each of the seating positions. The order of the seats 6a, 6b, 6c around or along the guide track assembly 8 may be maintained as the seats 6 move between the seating positions, e.g., the seats 6a, 6b, 6c may be prevented from moving past one another along the guide track assembly 8.

When the guide track assembly 8 extends around one or more sides of the interior space 10, e.g., does not form a closed loop, each of the seats may be movable between two or more of the seating positions. In such arrangements, a particular seat may not be movable along the guide track assembly 8 to each of the seating positions, due to the presence of the other seats. In some arrangements, the seats 6a, 6b, 6c may be configured to be detachable from the guide track assembly 8, in order to allow the order of the seats along the guide track assembly 8 to be changed. When the order of the seats is changed, the seating positions that a particular seat can be positioned in, e.g., before its movement along the guide track assembly 8 is blocked by the other seats, may also be changed.

FIGS. 1a, 1b and 1c depict three pre-defined seating configurations of the seating system 4. The seating configuration shown in FIG. 1a may be referred to as a standard manual driving configuration. In the standard manual driving configuration, each of the seats is pointing in the direction of travel of the vehicle. The first seat 6a of the vehicle is positioned towards the front of the vehicle, e.g., in a driving position 7a. The second and third seats 6b, 6c are arranged in a row, e.g., side by side, behind the first seat 6a.

The seats, such as the second and third seats 6b, 6c, may be moved from the configuration shown in FIG. 1a in order to arrange the seats in the configuration shown in FIG. 1b. The seating configuration shown in FIG. 1b may be referred to as a passenger conferencing configuration. In this configuration, the second and third seats 6b, 6c are arranged to facilitate conferencing between passengers and/or collaborative activities performed by the passengers. This configuration may typically be used when the vehicle is operating in a manual or semi-autonomous configuration. The first seat 6a therefore remains in the same position as in the arrangement shown in FIG. 1a, which is the driving position 7a, and remains facing forwards to provide the driver with a good view of the road ahead.

As shown in FIG. 1a, the vehicle 2 may comprise one or more trim portions configured to provide a storage surface such as a table 9 for an occupant of the vehicle. When the seats move between seating positions, one or more of the seats may move into positions that would interfere with the trim portion. For example, when the second seat 6b is in the fourth position 7d, as depicted in FIG. 1b, the second seat 6b would interfere with the table 9. Hence, the seating system 4 may be configured to control the position of a trim portion of the vehicle when a seat is positioned in or is moving towards a position that may interfere with the trim portion.

The vehicle 2 may be an autonomous vehicle capable of operating without input from the driver. When the vehicle 2 is operating in an autonomous operating mode, the first seat 6a, or another seat that is presently positioned in the driving position 7a, may be arranged together with the other seats into the configuration shown in FIG. 1c. In this configuration, the first seat 6a is turned to face in a rearwards direction of the vehicle, e.g., into the interior space 10. In this configuration, each of the seats is arranged to face into the interior space 10. This configuration may therefore facilitate group conversations and collaborative activities between each of the occupants of the vehicle.

The seating configuration shown in FIG. 1c may also be used when the vehicle is stationary and is not being driven by one of the occupants. The seating configuration shown in FIG. 1c may therefore also be used in vehicles that do not have an autonomous operating capability.

As depicted in FIG. 1a, the seating system 4 may further comprise a side table 12. The side table may be movably coupled to the guide track assembly in a similar manner to the seats and may be configured to move together with the seats.

With reference to FIG. 2, a seat 100 for the seating system 4 will now be described. The seats 6a, 6b, 6c depicted in FIGS. 1a-1c may be similar to the seat 100 shown in FIG. 2 and described below. The seat 100 comprises a seat body 110 having a base 112, a back rest 114 and a head rest 116. The seat body 110 is supported by a seat pillar 120. The seat pillar 120 extends in a substantially vertical direction from a first end 120a of the seat pillar to a second end 120b. The first end 120a of the seat pillar is coupled to the seat body 110, e.g., to the base 112, and the second end 120b is coupled to a boss 130 of the seat 100.

In the arrangement shown in FIG. 2, the seat pillar 120 is a tubular support member having an obround cross-section. However, in other arrangements, the cross-section of the seat pillar 120 may be circular, oval, square, rectangular or any other desirable shape. Alternatively, the seat pillar 120 may be a solid beam, such as an I-beam or any other desirable structure or framework. When the seat pillar 120 comprises a solid beam, such as an I-beam, the seat pillar 120 may comprise a tubular trim portion surrounding the solid beam.

The seat 100 further comprises one or more follower assemblies 132 coupled to the boss 130. The follower assemblies 132 are configured to engage the guide track assembly 8 in order to guide the movement of the seat 100 between seating positions, such as the seating positions 7a-7f shown in FIGS. 1a-1c. Additionally, the follower assemblies 132 and/or the boss 130 may be configured to support the seat 100 within the vehicle to transfer any loads from the seat, such as the weight of a passenger sat in the seat, to a frame (not shown) of the vehicle.

Figure 3:
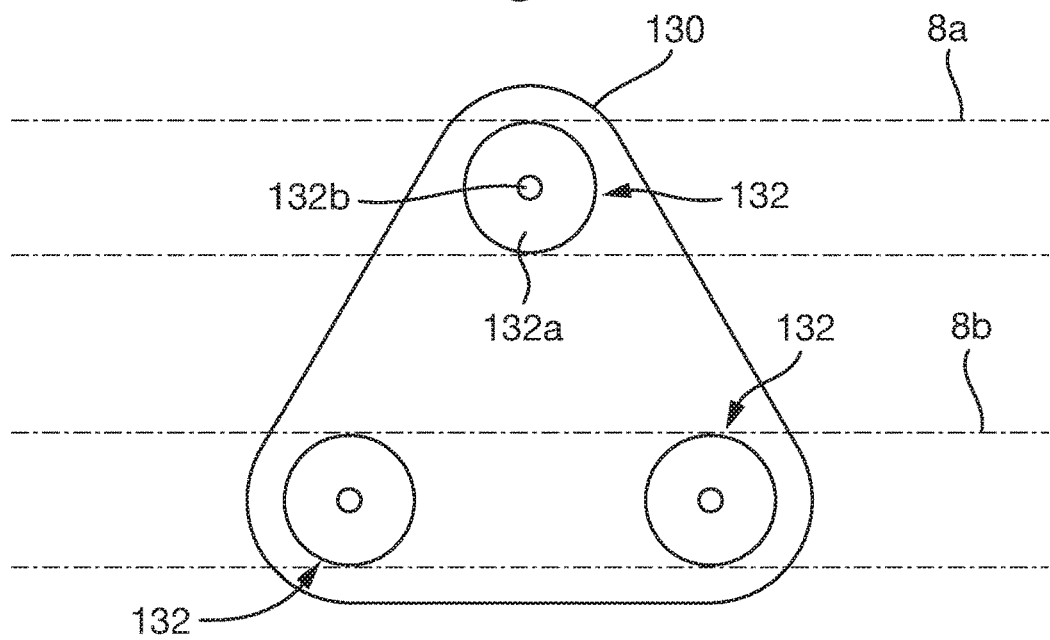
FIG. 3 is a schematic plan view of a boss for a seat, according to arrangements of the present disclosure.

With reference to FIG. 3, in one arrangement of the present disclosure, the follower assemblies 132 comprise one or more follower elements, such as rollers 132a rotatably coupled to the boss 130 by respective pivots 132b. The follower assemblies 132 engage with and roll along the guide tracks 8a, 8b of the guide track assembly 8 guide.

As depicted in FIG. 3, the boss 130 is substantially triangular, having three rounded corners. Three follower assemblies are coupled to the boss 130 close to the corners of the boss 130 on lines perpendicular to and bisecting the edges of the boss 130. One of the follower assemblies 132 is configured to engage with the first guide track 8a and two of the follower assemblies 132 are configured to engage with the second guide track 8b.

It is also contemplated that in other arrangements of the disclosure, the boss 130 may be any desirable shape and any number of follower assemblies 132 may be coupled to the boss. For example, the boss 130 may be circular, oval, square or rectangular and may comprise two, four, or more than four follower assemblies.

In other arrangements, different numbers of the follower assembly may engage with different ones of the guide tracks 8a, 8b. Furthermore, in the arrangement shown in FIG. 3, each of the follower assemblies 132 comprises a single follower element, such as a single roller 132a. However, in other arrangements, each follower assembly 132 may comprises two, three, four or more than four follower element, each configured to engage with the guide track assembly 8.

The boss 130 and follower assemblies 132 are configured such that the orientation of the boss 130 within the vehicle is determined according to the position of the seat 100 along the guide track assembly 8, such as the position on the guide tracks 8a, 8b at which the follower assemblies 132 are engaged.

The seat body 110 may be movably, e.g., pivotally, coupled to the first end 120a of the seat pillar 120. The seat body 110 is thereby able to pivot relative to the boss 130. As shown in FIGS. 1a-1c, pivoting the seat body 110 relative to the boss 130 allows the orientation of the seats to be adjusted without changing the positions of the seats within the vehicle. For example, when the second seat 6b is in the fourth position 7d, as illustrated in FIG. 1b. The seat body 110 of the second seat 6b can be turned to face in the direction of travel of the vehicle 2 without changing the position of the seat. Additionally, by allowing the seat body 110 to turn relative to the boss 130, the first seat 6a is able to turn when moving from the driving position 7a, in which the seat is facing in the direction of travel of the vehicle as depicted in FIG. 1a, to the sixth position 7f, in which the first seat is facing into the interior space 10 of the vehicle 2.

Additionally or alternatively, it is also contemplated that the seat pillar 120 may be pivotally coupled to the boss 130, such that the seat pillar 120 and the seat body can be rotated relative to the guide track assembly 8. Additionally or alternately, the follower assemblies 132 may be movably coupled to the boss 130 to allow the boss 130 to rotate relative to the guide track assembly 8.

In some arrangements, one or more of the seat bodies may not be movable relative to the seat pillar 120, the boss 130 or the follower assemblies 132 of the seat. For example, the second seat 6b may rotate as it moves between the fourth and second seating positions 7d, 7b by virtue of the curved portion of the guide track provided between these positions.

The seat body 110 may also be slidably coupled to the first end 120a of the seat pillar 120. In particular, the seat body 110 may be configured to slide forwards and backwards in a direction in which the seat is facing. When the seat 100 is positioned in the driving position 7a, sliding the seat body 110 backwards and forwards enables the driver to adjust their position relative to the driving controls.

In other arrangements, the driving controls may be movable. Additionally or alternatively, the guide track assembly 8 may be configured to allow the seat 100 to move forwards and backwards within the vehicle when positioned in the driving position 7a. For example, portions of the guide tracks 8a and 8b may extend forwards and rearwards from the driving position 7a to allow the seat 100 to move relative to the driving controls as desired. Additionally or alternatively, the boss 130 and/or the follower assembly 132 may be configured to allow the seat 100 to move forwards and backwards, in the direction in which the seat is facing, relative to the guide track assembly 8.

The seat 100 may comprise a locking mechanism 118 configured to prevent movement, e.g., pivoting and/or sliding, of the seat 100 or seat body 110 unless the locking mechanism 118 is disengaged.

Figure 4:
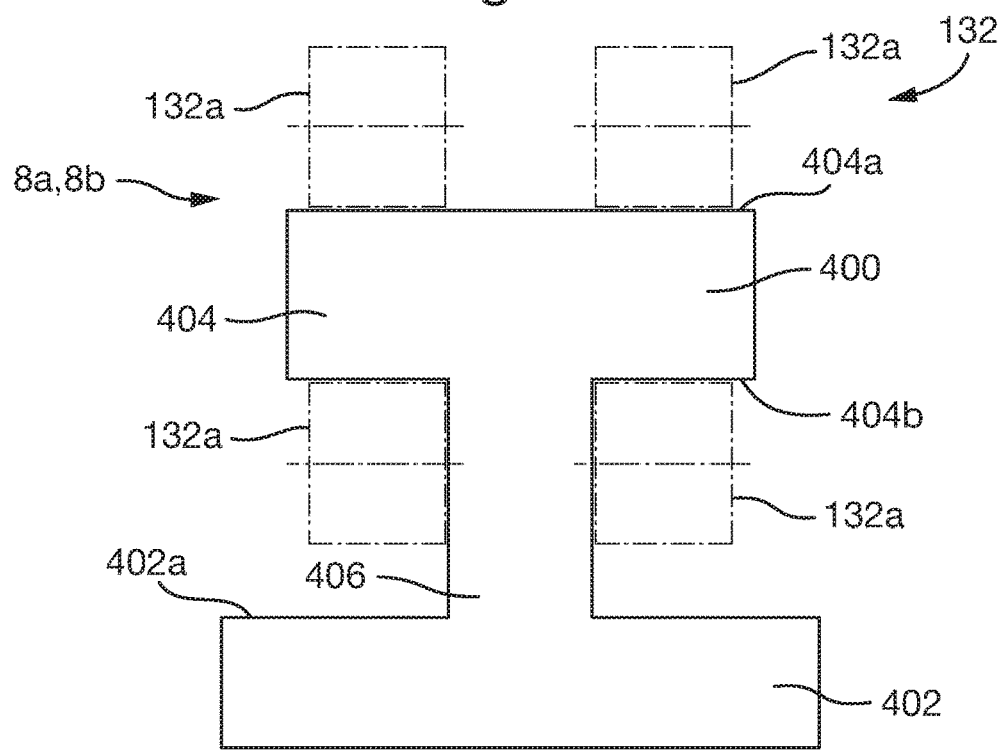
FIG. 4 is a cross-sectional view of a guide track for a seating system according to arrangements of the present disclosure.

With reference to FIG. 4, one or each of the first and second guide tracks 8a, 8b may comprise a rail 400 having a base flange 402, a head flange 404 and a web 406 between the head flange 404 and the base flange 402. The base flange 402 may be coupled to the frame of the vehicle. The follower assemblies 132 of the seat 100 may be configured to engage with the head flange of the rail 400. The follower assemblies 132 roll along the head flange 404 in order to allow the seat 100 to move along the guide track 8a, 8b.

The follower assemblies 132, such as rollers 132a of the follower assemblies, may be configured to engage with a top surface 404a and/or a bottom surface 404b of the head flange 404. For example, in the arrangement shown in FIG. 4, the follower assembly 132 comprises four rollers 132a configured to engage with the top and bottom surfaces of the head flange 404 on both sides of the web 406. In other arrangements, the follower assemblies 132 may additionally or alternatively be configured to engage with the base flange 402, e.g., a top surface 402a of the base flange. Additionally or alternatively again, the follower assemblies 132 may be configured to engage the rail web 406.

Figure 5:
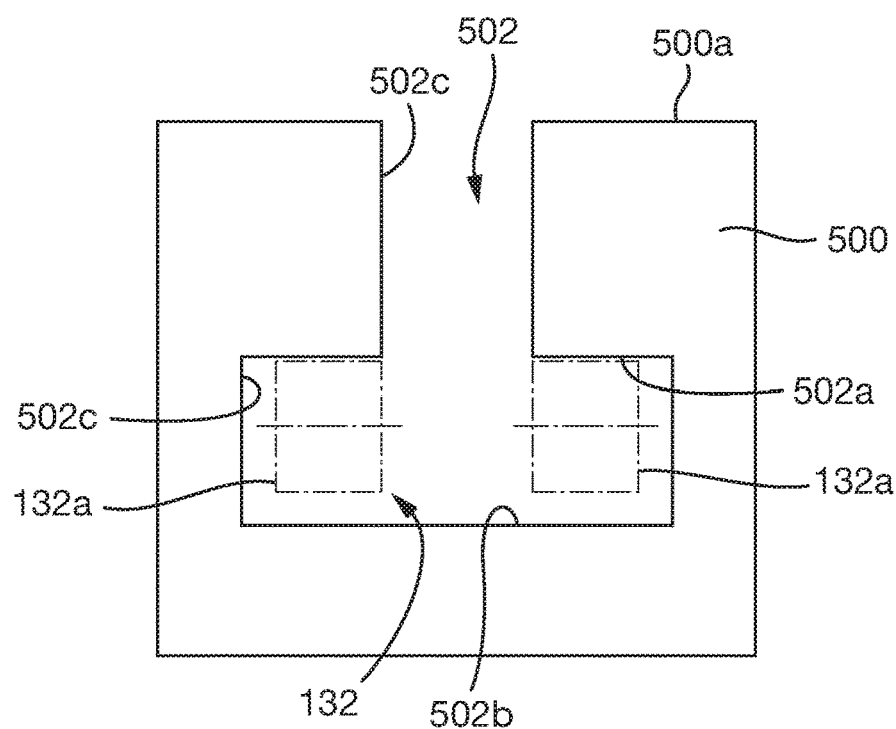
FIG. 5 is a cross-sectional view of a guide track for a seating system according to arrangements of the present disclosure.

With reference to FIG. 5, in another arrangement of the disclosure, one or each of the guide tracks 8a, 8b may comprise a channel 500 having a slot 502, such as a T-shaped slot. The follower assemblies 132 may be at least partially received within the slot 502. For example, rollers 132a of the follower assemblies 132 may be disposed within the slot. The follower assemblies 132 may be configured to engage with the channel 500 at the slot 502 in order to support the movement of the seat 100 along the guide tracks 8a, 8b.

In the arrangement shown, the follower assembly 132 is configured to engage with an upper, inside surface 502a of the slot. In other arrangements, the follower assemblies 132 may be configured to engage with a lower, inside surface 502b of the slot. Additionally or alternatively, in some arrangements, the follower assembly 132 may be configured to engage with one or more side surfaces 502c of the slot. Additionally or alternatively, the follower assembly 132 may be configured to engage with an upper surface of the channel 500a outside of the slot 502. For example, the follower assembly 132 may comprise one or more rollers 132a arranged outside of the slot 502.

In the arrangements shown in FIGS. 4 and 5, the rollers 132a are configured to rotate about axes that are substantially horizontal. Alternatively, as shown in FIG. 3, one or more of the rollers 132a may be configured to rotate about axes that are substantially vertical. Alternatively, one or more of the rollers 132a may be configure to rotate about axes arranged in any other desirable direction, according to the shape of the guide tracks 8a, 8b and the orientation of the surfaces with which the rollers 132a engage.

Figure 6:
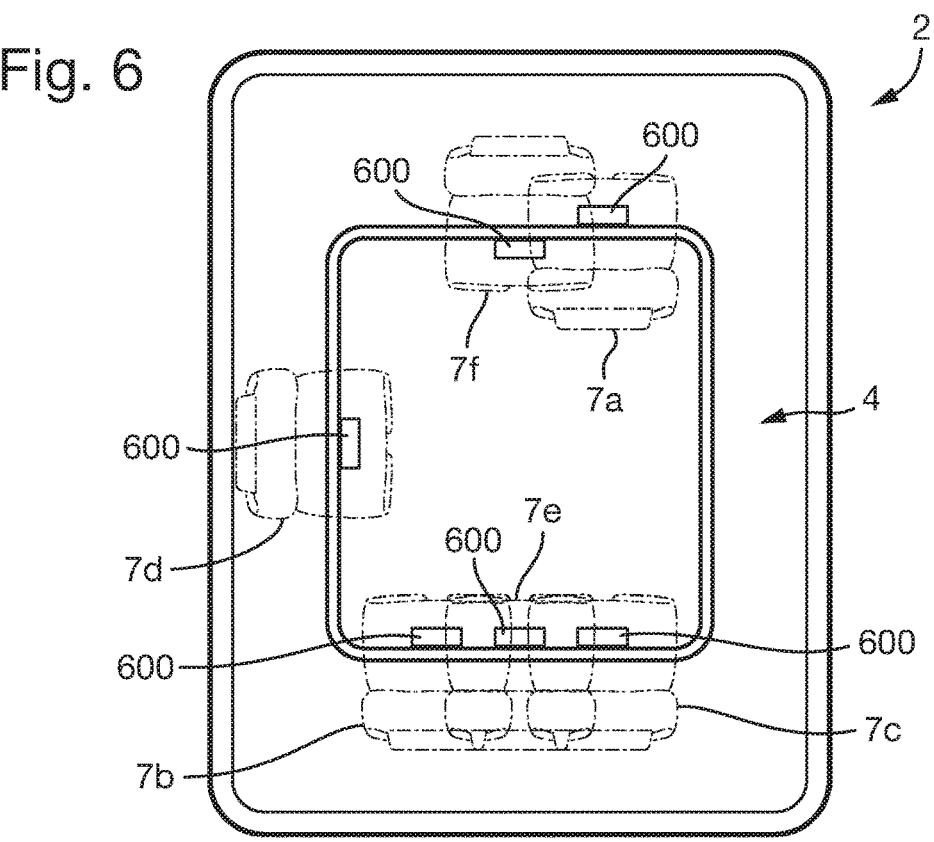
FIG. 6 is a schematic view of a seating system for a motor vehicle comprising seat securing mechanisms according to arrangements of the present disclosure.

With reference to FIG. 6, the seating system 4 may further comprise one or more securing mechanisms 600 configured to selectively secure the seats 100 relative to the frame of the vehicle, in order to prevent movement of the seats along the guide track assembly 8. The seats 100 may be secured using the securing mechanisms 600 at least when the vehicle is moving, in order to prevent undesirable movement of the seats 100.

The securing mechanisms 600 may be provided on the guide track assembly 8 or may be coupled to the frame of the vehicle 2. The securing mechanisms 600 may be configured to engage with the boss 130 and/or follower assemblies 132 of the seats 100 in order to prevent their movement along the guide tracks 8a, 8b. Additionally or alternatively, the securing mechanisms 600 may be configured to engage with a dedicated securing feature (not shown) provided on the seat 100. The securing mechanisms 600 may be provided at each of the seating positions 7a-7f defined by the seating system 4 to allow the seats 6a, 6b, 6c to be secured at each of the seating positions 7a-7f depicted in FIGS. 1a-1c.

In other arrangements of the present disclosure, the securing mechanisms 600 may be provided on the seats 100. For example, the securing mechanism 600 may be provided on the boss 130 or seat pillar 120. In such arrangements, the securing mechanisms 600 may be configured to engage with the guide track assembly 8 and/or the frame of the vehicle in order to prevent movement of the seats 100. Alternatively, the securing mechanism 600 may be configured to prevent the follower assemblies 132 from moving along the guide tracks 8a, 8b in order to prevent movement of the seats 100. For example, the securing mechanisms 600 may prevent rollers 132a of the follower assemblies 132 from rotating and rolling along the guide tracks 8a, 8b.

When the securing mechanisms 600 are provided on the seats, the seating system 4 may be configured such that the seats 100 can be secured in any position along the guide track assembly 8, e.g., the positions of the seats may not be restricted to predetermined seating positions, such as the seating positions 7a-7f depicted in FIGS. 1a-1c and 5. However, in some arrangements, the securing mechanisms 600 may be configured such that the seats 100 can only be secured within the predetermined seating positions. For example, the securing mechanisms 600 provided on the seats 100 may be configured to engage with securing features provided on the guide track assembly 8 or the frame of the vehicle at the predefined seating positions 7a-7f.

Even when the securing mechanism 600 is capable of securing the seats 100 in any position along the guide track assembly, it may be desirable that the seats are only secured in particular positions, such as the predetermined seating positions 7a-7f The seating assembly 4 may comprise one or more seat positions sensors configured to determine the positions of the seats. The securing mechanisms 600 may be prevented from securing the seats relative to the guide track assembly 8 when the seats are not in predetermined seating positions. The seat positions sensors may be provided on the seats 100, alternatively, the seat position sensors may be provided on the guide track assembly 8 or frame of the vehicle.

The seating system 4 may be configured to indicate to a user when the seats 6a, 6b, 6c are positioned in the predetermined seating positions 7a-7f and can be secured. For example, the seating system 4 may be configured to illuminate a light to indicate that a seat is in a suitable position, or display a message on a display screen provided on the vehicle. In some arrangements, the seating system 4 may be configured to indicate where, e.g., in which direction, a particular seat should be moved in order to position the seat in the closest predetermined seating position.

Figure 7:
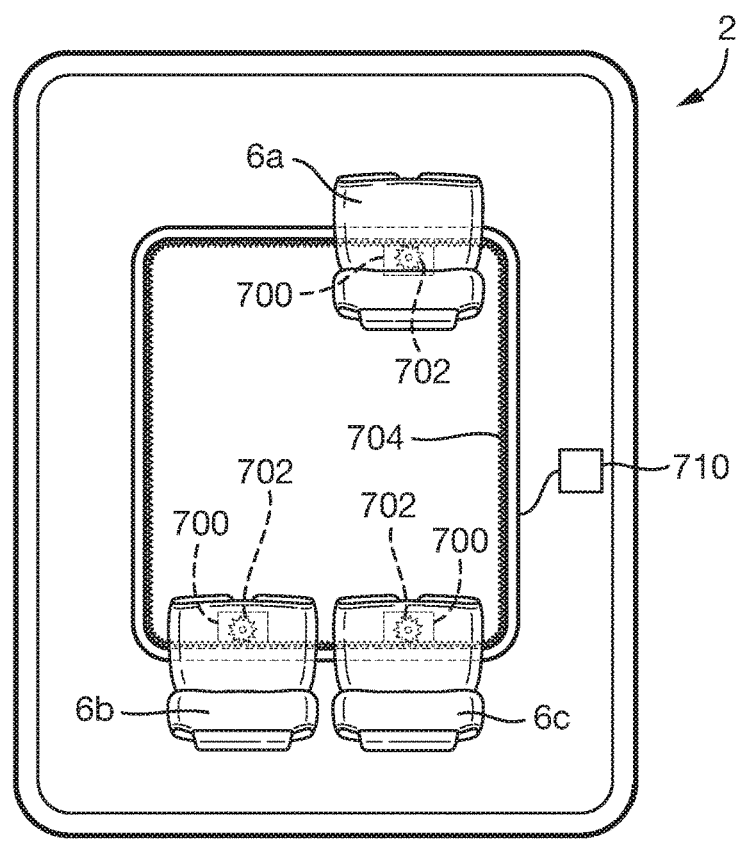
FIG. 7 is a schematic view of a seating system for a motor vehicle comprising a plurality of seat actuators according to arrangements of the present disclosure.

With reference to FIG. 7, the seating system 4 may comprise one or more actuators 700 configured to drive the movement of the seats 6a, 6b, 6c between the seating positions 7a-7f However in alternative arrangements, an actuator may not be provided and the seats may be moved manually between the different seating positions. In the arrangement shown in FIG. 7, an actuator 700 is provided on each of the seats 6a, 6b, 6c. The actuator 700 provided on each seat drives the movement of the corresponding seat along the guide track assembly 8 individually, e.g., separately from the movement of the other seats.

In the arrangement shown in FIG. 7, the actuators 700 are configured to rotate one or more pinion gears 702 that meshes with one or more racks 704 provided on the guide track assembly 8 in order to drive the seats 6a, 6b, 6c along the guide track assembly 8. The follower assembly 132 may comprise the pinion gears 702. For example, rollers 132a of the follower assembly may define the pinion gears 702 and the rack 704 may be coupled to or formed on one or both of the guide tracks 8a, 8b.

The seating system 4 may comprise a controller 710 configured to control the operation of each of the actuators 700. For example, the controller 710 may control the actuators 700 in order to move the seats between predefined seating configurations, such as the seating configurations shown in FIGS. 1*a*, 1*b* and 1*c*. Alternatively, each of the actuators 700 may be controlled separately. For example, each actuator 700 may be associated with an input device configured to allow a user of the seating system 4 or the occupant of a particular seat to control the operation of the associated actuator provided on the particular seat.

Figure 8:
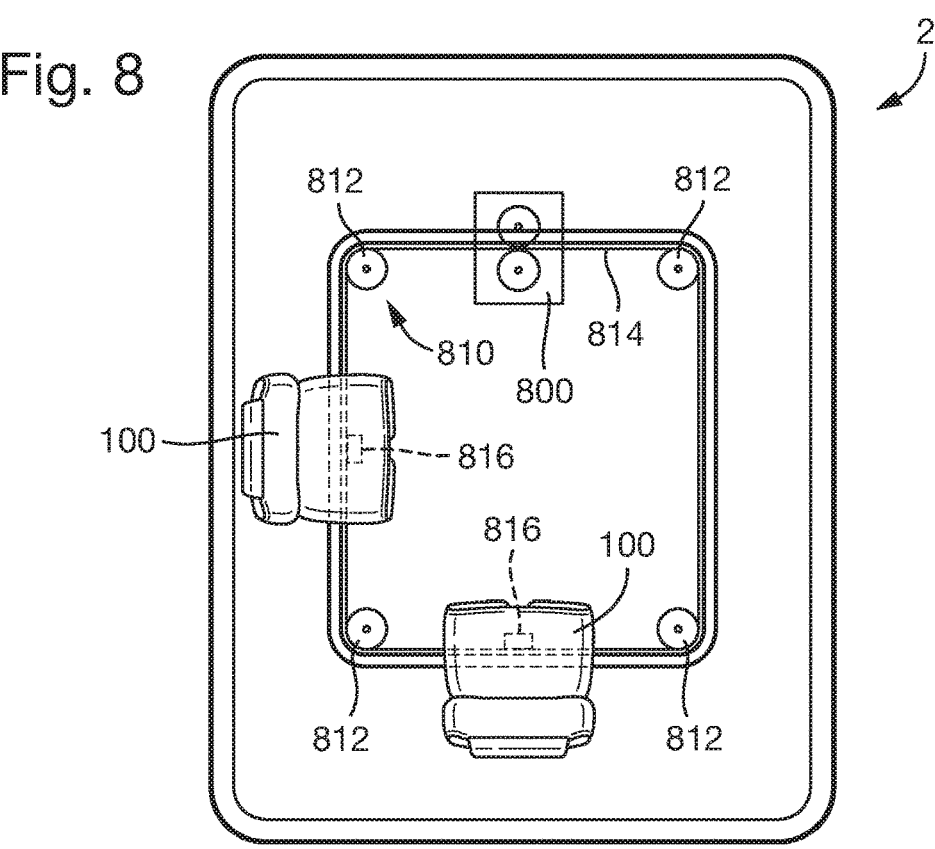
FIG. 8 is a schematic view of a seating system for a motor vehicle comprising a single seat actuator according to arrangements of the present disclosure.

With reference to FIG. 8, in an alternative arrangement of the present disclosure, an actuator 800 is provided on the guide track assembly 8 or frame of the vehicle. In other words, the actuator 800 may be fixed relative to the frame of the vehicle and may not move together with the seats 6*a*, 6*b*, 6*c*. The seating system 4 further comprises a drive mechanism 810 powered by the actuator 800. In the arrangement shown in FIG. 8, the drive mechanism 810 comprises a cable drive system comprising a plurality of pulleys 812 and a cable 814. However, the drive mechanism 810 may additionally or alternatively comprise any other suitable drive mechanism, such as a chain or gear drive mechanism. The drive mechanism 810 is configured such that the cable 814 follows the guide track assembly 8. The seats 6*a*, 6*b*, 6*c* can be coupled to the drive mechanism, e.g., to the cable 814, such that the movement of the seats is driven by the actuator 800 via the drive mechanism 810.

In the arrangement shown in FIG. 8, each of the seats 100 comprises a drive coupler 816 associated with the seat and configured to couple the associated seat 100 to the drive mechanism 810. The drive coupler 816 may be configured to selectively couple the associated seat to the drive mechanism 810. In this way, a particular seat can be decoupled from drive mechanism 810 while the movement of others of the seats continues to be driven by the drive mechanism 810. This allows the relative positions of the seats to be changed. One or more actuators and associated drive mechanisms can thereby be used to control the positions of a greater number of seats.

In one arrangement, a single actuator 800 may be used to control the position of each of the seats 100 provided within the vehicle 2. In other arrangements, the seating system 4 may comprise two or more actuators 800 and a drive mechanism 810 associated with each of the actuators 800. For example, a first group, such as two of the seats, may be couplable to a first drive mechanism driven by a first actuator and a second group of seats, such as a remaining seat, may be couplable to the second drive mechanism driven by a second actuator. Alternatively, the seating system 4 may comprise an actuator 800 and drive mechanism 810 for each of the seats 100 provided within the seating system 4.

Figure 9:
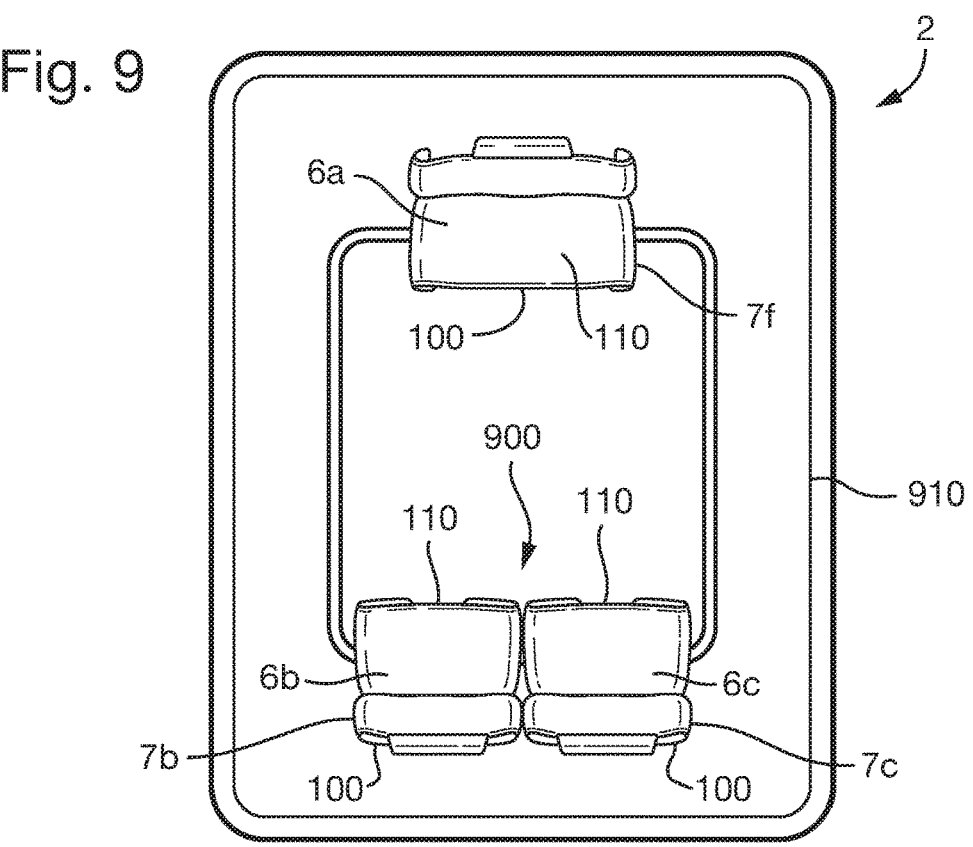
FIG. 9 is a schematic view of a seating system for a motor vehicle according to arrangements of the present disclosure.

With reference to FIG. 9, the width of each of the seats 100, e.g., the seat bodies 110 of the seats, may be selectively variable, e.g., adjustable. The width of the seats 100 may be adjusted between a first width (as depicted in FIGS. 1*a*-1*c*) and a second width (as depicted in FIG. 9). As shown in FIG. 9 when the widths of two adjacent seats 6*b*, 6*c* has been increased, the seat bodies 110 of the adjacent seats may abut. The two adjacent seats can thereby form a bench seat 900. Forming the bench seat 900 may allow an additional occupant to be seated in the vehicle. When the adjacent seats are arranged in the second and third seating positions 7*b*, 7*c*, the seat bodies may abut at a center of the vehicle and the bench seat may extend across substantially the complete width of the interior of the vehicle 2.

As shown in FIG. 9, the seat body 110 of the driver's seat 6*a*, which has been moved into the sixth position 7*f*, can also be extended to allow an additional occupant to sit within the vehicle. When the widths of the seat bodies 110 have been extended, the seats 100 may be too wide to move along the guide track assembly 8 between the seating positions 7*a*-7*f* without contacting interior walls 910 of the vehicle 2 or the other seats. In particular, the seats 100 may contact interior walls 910 of the vehicle when moving around corners defined by the guide track assembly 8. Hence, the width of the seats 6*a*, 6*b*, 6*c* may be reduced, e.g., to the first width, before the seats are moved along the guide tracks 8*a*, 8*b*.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle seating system comprising:
two or more seats;
a seat position sensor configured to determine whether one or more seats are positioned in seating positions, wherein the seating system is configured to indicate to a user whether the seats are positioned in the seating positions, and wherein the seating system is configured to control a position of a trim portion of the vehicle when at least one of the seats is positioned at a predetermined position; and
a guide track extending between three or more spaced apart seating positions within an interior of the motor vehicle, wherein each of the seats is movably coupled to the guide track, such that the seats are movable between the seating positions.

2. The seating system of claim 1, wherein the guide track extends at least partially around a space within the interior of the vehicle.

3. The seating system of claim 1, wherein a first portion of the guide track extends in a substantially longitudinal direction of the vehicle, and the guide track comprises a curved portion.

4. The seating system of claim 1, wherein each of the seats provided within the vehicle is movably coupled to the guide track, and wherein a first seating position is located at a front of the vehicle interior, a second seating position is located at a rear of the vehicle interior, and a third seating position is positioned between the first and second seating positions in a longitudinal direction of the vehicle and spaced apart from the first and second seating positions in a lateral direction of the vehicle.

5. The seating system of claim 1, wherein one or more of the seats are rotatable within the interior, wherein the seats are rotatable within the interior by virtue of a curved portion of the guide track.

6. The seating system of claim 1, wherein the seats are rotatable in the seating positions, about axes of the respective seats.

7. The seating system of claim 1, wherein the guide track comprises a rail or slot and wherein each of the seats comprises a follower element configured to movably couple the seat to the guide track.

8. The seating system of claim 1, wherein the seating system comprises a further guide track provided adjacent to the guide track and extending parallel to the guide track between the three or more seating positions, wherein the seats are movably coupled to the further guide track.

9. The seating system of claim 1, wherein the seating system comprises two or more securing mechanisms configured to selectively secure the seats relative to a frame of the vehicle, wherein the securing mechanisms are provided on the seats and are movable together with the seats between the seating positions or are coupled to the guide track and/or a frame of the vehicle.

10. The seating system of claim 9, wherein the securing mechanisms are configured to secure the seats relative to the frame of the vehicle when the seat position sensor determines that the seats are positioned in the seating positions.

11. The seating system of claim 1, wherein the seating system comprises one or more actuators configured to drive the movement of the seats between the seating positions.

12. The seating system of claim 1, wherein the seating system comprises an actuator associated with each of the seats, wherein each actuator is configured to drive the movement of the corresponding seat between the seating positions, wherein each actuator is provided on the corresponding seat or the actuators are coupled to the guide track and/or a frame of the vehicle.

13. The seating system of claim 12, wherein the seating system comprises one or more drive mechanisms driven by the actuators, wherein one or more of the seats are operatively couplable to the drive mechanisms, wherein the seats each comprise a drive coupler configured to selectively couple the seat to a drive mechanism driven by the actuator, and wherein the seating system is configured to decouple a particular seat from the drive mechanism when the seat is moved into a particular seating position, such that the particular seat remains in the particular seating position.

14. The seating system of claim 1, wherein one or more of the seats are configured such that a width of a seat body of the seat is adjustable, and wherein the width of the seat body is adjustable between a first width and a second width, wherein the first width is narrower than the second width, wherein the seating system is configured such that, the seat bodies of two laterally spaced adjacent seats abut, when the widths of the seat bodies of two adjacent seats are the second width and wherein at least one of the seats is movable along the guide track without contacting an interior wall of the vehicle or other seats when the widths of the seat body is the first width.

15. The seating system of claim 1, wherein the seating system further comprises a table movably coupled to the guide track.

16. A seat for a seating system of a motor vehicle comprising:
   a seat body;
   a pillar coupled to the seat body at a first end of the pillar and configured to support the seat body;
   a boss coupled to a second end of the pillar;
   one or more follower elements coupled to the boss and configured to movably couple to a guide track provided on the motor vehicle, such that the seat is movable within an interior of the vehicle between two or more spaced apart seating positions; and
   a seat position sensor configured to determine whether the seat is located in one of the seating positions.

17. The seat according claim 16, wherein the seat comprises a securing mechanism configured to prevent movement of the seat relative to the guide track and/or a frame of the motor vehicle when the securing mechanism is applied when the seat is located in one of the seating positions, and wherein the seat comprises a securing point couplable to a securing mechanism provided on the guide track or a frame of the vehicle in order to prevent movement of the seat relative to the guide track and/or the frame of the vehicle when the securing mechanism is applied.

18. The seat according to claim 16, wherein the seat comprises an actuator configured to drive the movement of the seat between the seating positions.

19. The seat according to claim 16, wherein the seat comprises a drive coupler configured to selectively couple the seat to a drive mechanism of the seating system configured to drive the movement of the seat between the seating positions.

* * * * *